Aug. 17, 1965  G. E. W. LEWIN  3,201,160
LOCKING DEVICE FOR DOORS, SHUTTERS AND THE LIKE
Filed July 30, 1962  3 Sheets-Sheet 1
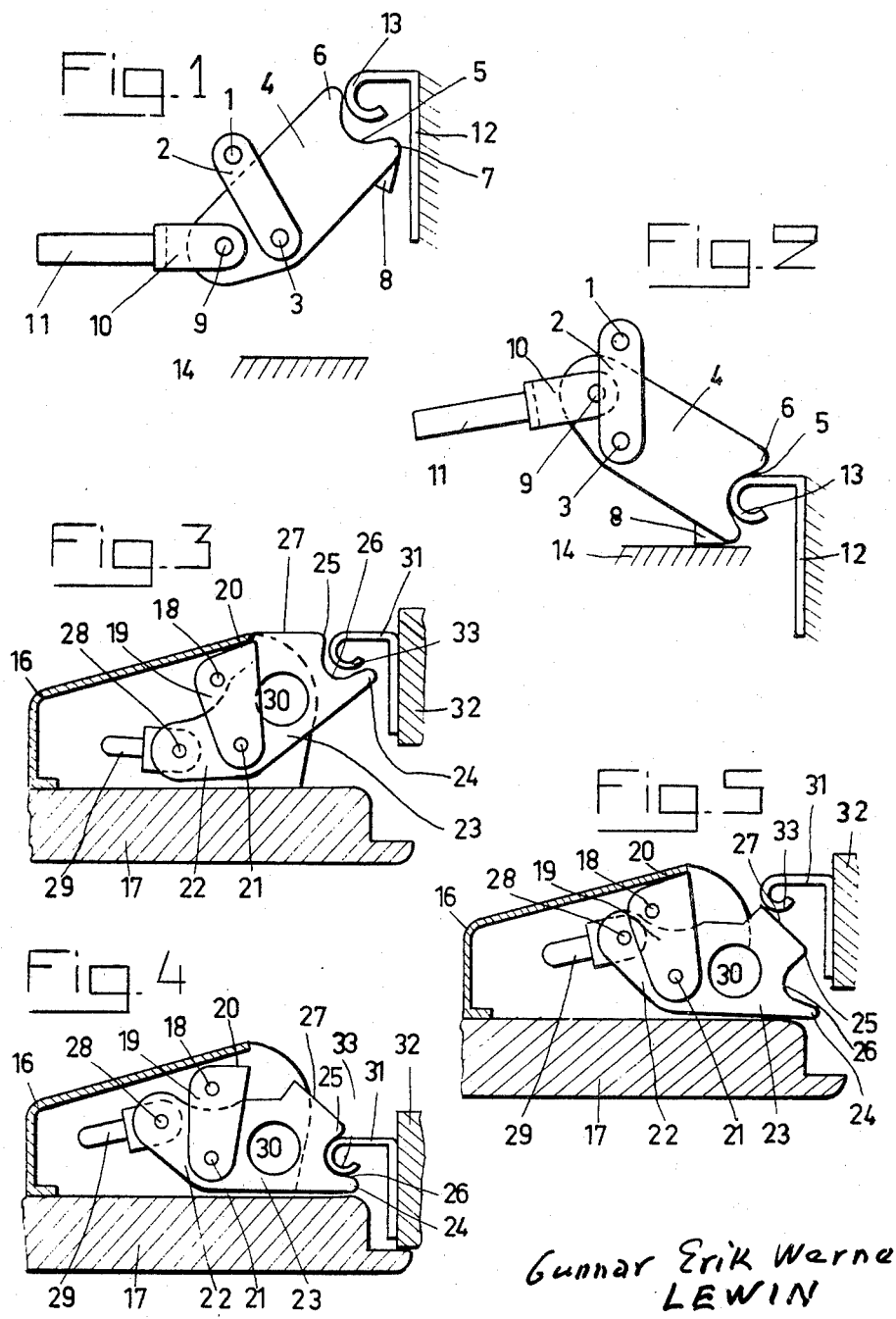
Gunnar Erik Werner
LEWIN
INVENTOR.
BY J. Delattre-Seguy
Attorney

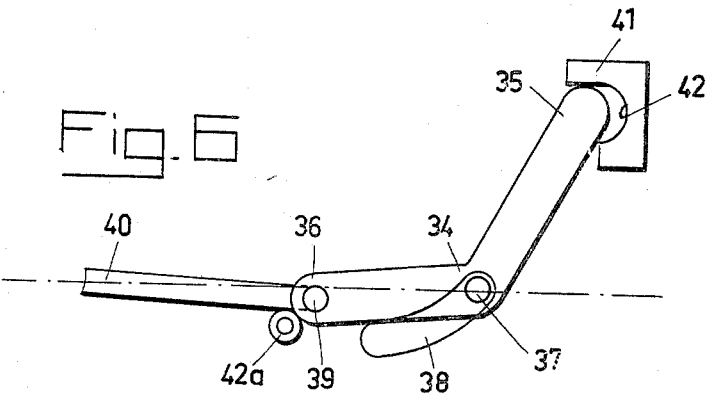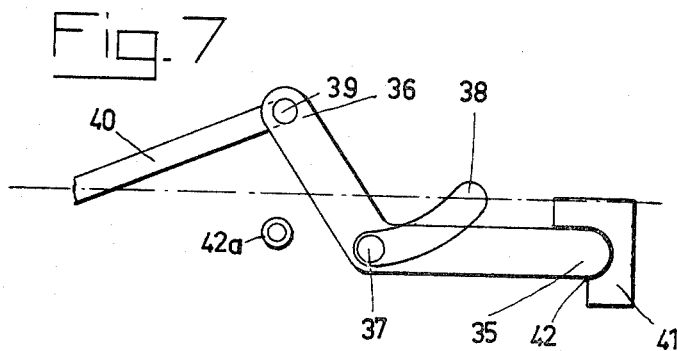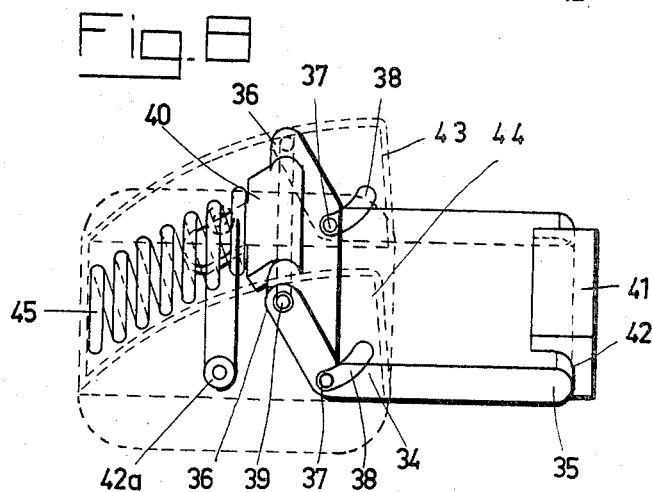

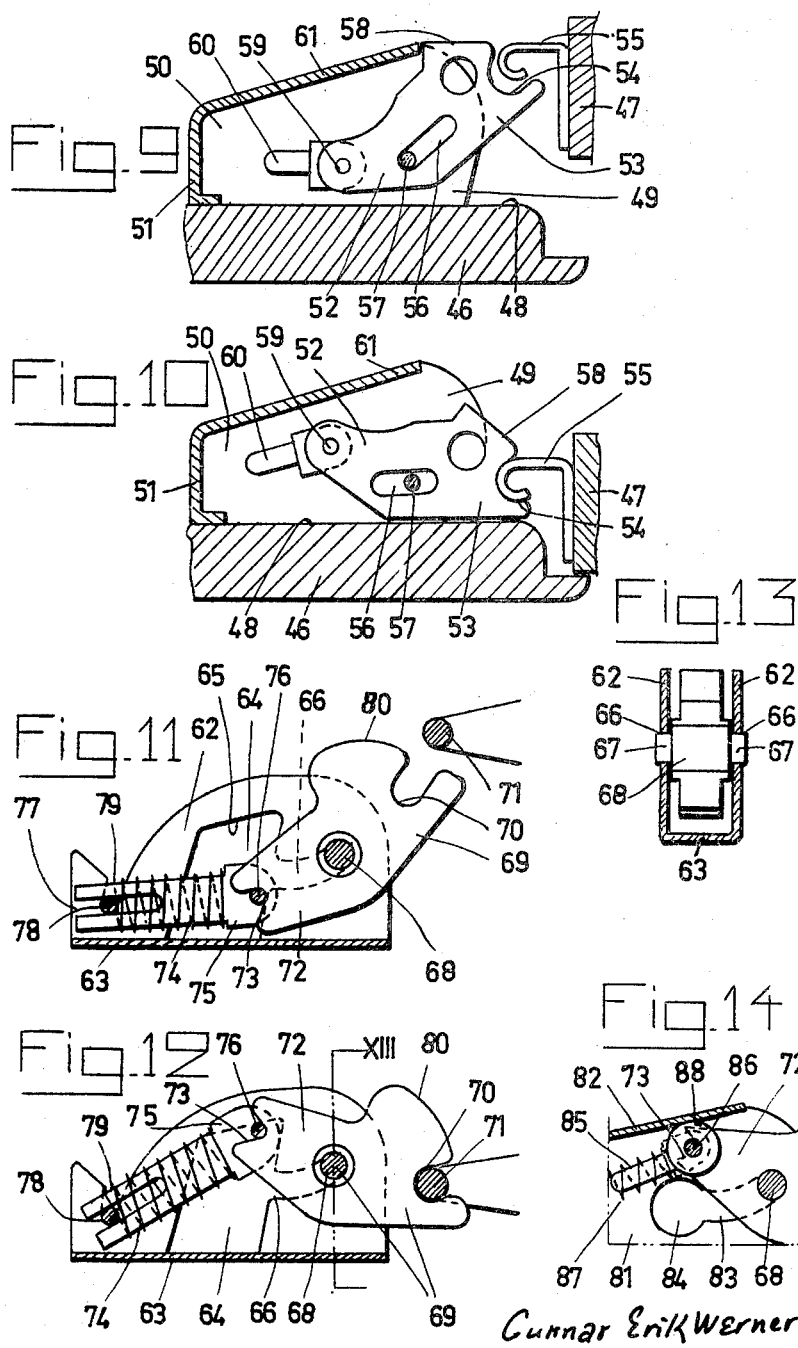

United States Patent Office 3,201,160
Patented Aug. 17, 1965

3,201,160
LOCKING DEVICE FOR DOORS, SHUTTERS AND THE LIKE
Gunnar Erik Werner Lewin, Hastangvagen 12, Viggbyholm, Sweden
Filed July 30, 1962, Ser. No. 213,435
4 Claims. (Cl. 292—71)

This invention relates to a device in locks for doors, shutters and the like, which are provided with a swingable lock plunger mounted on the door or the frame and adapted to co-operate, for locking the door, with a means (lock plate) mounted on that one of the said parts which is not provided with the lock plunger.

Thus, the invention deals with a lock which works independently of the movements of the door in the frame, such as may be caused by swelling, or by shrinking due to drying. The device also allows soft closing of the door.

A locking device according to the invention is mainly characterized by a lock plunger consisting of two levers forming an obtuse angle with each other, one of the levers being a locking arm and the other an operating arm, said lock plunger being swingable between two positions around a pivot axle extending substantially through the intersectional point of the levers and perpendicularly to the levers, the end of the locking arm facing off the pivot axle being provided with a recess intended to co-operate with a means, such as a lock plate fastened to a door frame or the like, and the end of the operating arm facing off the pivot axle being adapted to be actuated by a compressive force, such as exerted by a spring, which shifts the lock plunger instantaneously from one position to the other, said pivot axle being adapted to move away from said means during such a swinging that is caused when closing the door, the lock plunger at the same time turning about the pivot axle with said means as a centre.

A modification of the locking device is mainly characterized in that the pivot axle is fitted in those ends of a pair of links that face the inside of the door, the other ends of said links being swingable about a swing axle paralleling the firstmentioned axle, said links being arranged in such a way that a plane through the axle of the lock plunger and the swing axle of the links is, in the locking position of the locking device, substantially at right angles to the inside of the door etc. and substantially parallel to the door frame etc.

A further feature of the locking device is that the end of the lock plunger engaging with the lock plate is provided with a stop lug on the side facing the door etc., which stop lug serves to confine the closing depth of the door etc. and the turning movement of the locking bar in the closing direction by abutting against the inside of the door etc. when the door is being closed. The part of the lock plunger which is facing off the door inside when in the locking position and is located adjacent to the lock plunger portion co-operating with the lock plate may be provided with a slide face forming an acute angle with the door side and intended to serve as a "fall" in case the lock plunger has, in the open position of the door, been unintentionally brought into the position it should normally assume when the door is closed. This slide face may be arranged so as to coincide in the inoperative position of the lock plunger (i.e. the position the lock plunger has normally assumed when the door is being opened) with and constitute an extension of the outer surface of a lock casing enclosing the lock mechanism.

The side of the lock plunger opposing the slide face, i.e. the side facing the door may be substantially parallel to the door inside when the lock plunger is in the locking position.

The link ends facing off the door may have stop faces adapted to rest against the inside of the lock casing for limiting the advance of the lock plunger towards the lock plate when the lock plunger is in the position located nearest to the lock plate.

A further feature of the invention is that the lock plunger is provided at the angle with two pins projecting from the plunger sides and sliding in slots provided in the sides of a casing enclosing the locking device, and that the free end of the lever is hinged to one end of a pressure-loaded link, the lock plunger being adapted to swing about the free end of the locking arm, using the means as a bearing, while the door is being closed, during which movement of the plunger the pins are sliding in the slots in the direction away from the means while the plunger itself turns about the pins and the lever gradually moves away from its initial position, the lever motion first being counter-acted by the pressure-loaded link and finally being accomplished by action of the latter.

A modification of the locking device is mainly characterized in that the lock plunger is provided, in the angle between the lever and the locking arm, with a through slot, which extends along the locking arm and receives an axle serving as bearing for the swinging movement of the lock plunger and fastened in a lock casing enclosing the lock mechanism.

In another modification of the locking device the lock plunger is provided in the angle between the locking arm and the lever, with a through axle, the ends of which are rotary and displaceable in slots provided in the walls of a lock casing enclosing the lock mechanism, the slots extending substantially in the direction indicated by the pressure-loaded lever when the lock plunger is in inoperative position.

Three embodiments of the invention are described in detail in the following text, reference being made to the accompanying drawings, in which:

FIGS. 1 and 2 show one embodiment in two positions, FIG. 1 in the inoperative position and FIG. 2 in the locking position of the lock plunger, FIGS. 3–5 show another embodiment, FIG. 3 with the lock plunger in the inoperative position and FIG. 4 with the lock plunger in locking position. FIG. 5 shows how the lock plate can actuate the lock plunger even though the latter has shifted to the locking position before the door is closed, FIGS. 6 and 7 are side views of the first embodiment in two different positions, FIG. 8 is a perspective view of the locking device shown in FIGS. 6 and 7, enclosed in a casing, FIG. 9 is a longitudinal section through a modification of the locking device, with the lock plunger in the inoperative position, FIG. 10 is the longitudinal section shown in FIG. 9, only in FIG. 10 the lock plunger is in locking position, FIG. 11 is a longitudinal section through another embodiment of the invention, with the lock plunger in the inoperative position, FIG. 12 is the same longitudinal section as shown in FIG. 11, only here the lock plunger is in the locking position, FIG. 13 is a cross-section through the locking device shown in FIG. 12, taken along the line XIII—XIII in FIG. 12, FIG. 14 shows a partial longitudinal section, resembling the section shown in FIG. 12, where the end of the lever is provided with one or more rollers.

In FIGS. 1 and 2 the numeral 1 designates an axle, which is stationarily mounted in the side walls of a casing not shown in the drawing. The numeral 2 designates links, the upper ends of which are journalled on the swing axle 1 and the lower ends of which carry a rotary axle 3.

4 is a substantially rectangular lock plunger made of plastic or a similar material. The outside end of the lock plunger is provided with a recess 5, which is confined by one relatively short projection 6 and one somewhat longer projection 7. 8 is a lug on the projection 7. Stationarily mounted in the other end of the lock plunger 4 is an axle 9, the ends of which are rotary in a fork 10 embracing the lock plunger 4 and provided with a rod 11. The locking effect is obtained by co-operation between the projection 7 of the lock plunger 4 and a lock plate 12, which is provided with a circularly bent, resilient tongue 13 co-operating directly with the recess 5. 14 is the inside of a door.

In FIG. 1 the door is thought to be open and the locking device in the inoperative position. When the door is swung closed, the recess 5 of the lock plunger 4 is actuated by the tongue 13 on the lock plate 12, the tongue first engaging the longer projection 7 of the lock plunger 4 and then, during the continued turning of the plunger 4, entering the recess 5, and finally, at the continued swinging of the door, pushing the lock plunger 4 away from the lock plate 12, the rotary axle 3 of the lock plunger 4 in consequence turning the links 2 on the axle 1, the ends of which are fastened in the side walls of the casing (not shown in the drawing). When during the swinging of the lock plunger and its displacement in the links 2 the necessary distance is obtained between the rotary axle 3 of the lock plunger and the tongue 13 on the lock plate 12 to allow a swinging of the lock plunger, and an extension of the axle of the rod 11 has passed the tongue 13, the distance between the swing axle 1 and the tongue 13 will increase, so that the links 2 are turned on the swing axle 1 and the lock plunger 4 is pressed against the tongue 13. In the entirely closed position, as shown in FIG. 2, the recess 5 of the lock plunger 4 is held pressed against the tongue 13, and thus the door is held pressed against the frame.

When the door is opened the links 2 must be pressed away from the lock plate 12 again, returning into inoperative position according to FIG. 1 after the extended axle of the rod 11 has passed through the tongue 12, thereby promoting the opening of the door by exerting a pressure on it. The upper projection 6 of the recess 5 is shorter than the lower projection 7 to allow full engagement of the tongue 13 when the device is in fully locking position as shown in FIG. 2, and besides, the longer projection 7 provides a more reliable seat for the tongue 13 at the first contact with the lock plunger 4. The lug 8 abuts against the inside 14 of the door during the final closing movement of the lock plunger 14 in order to soften the impact of the door against the frame.

The axles 3 and 9 are inserted under pressure in tapered holes throughpassing the lock plunger 4.

In FIGS. 3–5, which show another design of the locking device, the numeral 16 designates a casing which is fastened to the door 17 and carries rigidly a swing axle 18 in holes provided in its side walls. Pivoted on the swing able 18 are links 19, which are provided with upper abutment surfaces 20 and have, in their opposite lower ends, holes in which a rotary axle 21 throughpassing the lock plungers 22, 23 is journalled. 24 is a projection at the free end of the lock plunger 23 and 25 is a shorter projection on the other side of a recess 26. The lock plunger 23 is provided with a flat surface 27 extending from the projection 25. In the inoperative position of the lock, this flat surface is flush with the top of the casing 16, whereas in the locking position of the lock it forms a sloping slide surface. The end 22 of the plunger facing the interior of the casing 16 is slotted and penetrated by a pin 28 on which one end of a thrust-loaded, for instance spring-loaded rod 29 is pivoted. A hole 30 in the lock plunger serves to damp the sound of the lock plunger striking against the casing 16 and the lock plate 31, which is fastened to the door frame 32. The angular part of the lock plate facing the lock is provided with a circularly bent resilient tongue 33, that is adapted to fit into the recess 26 of the lock plunger 23 when the latter is swung from inoperative to locking position and to be retained by pressure when the lock is in the locking position.

In FIG. 3 the door is open and the lock is in the inoperative position. When swinging the door shut, the lock plunger 23 is actuated via the recess 26 by the tongue 33 of the lock plate so that the lock plunger 23 is moved into the locking position as shown in FIG. 4 under pressure from the rod 29 and under rocking of the links 19, and the door is pressed against the frame 32.

In FIG. 5, the lock is in the locking position, i.e. with the door open the lock plunger 23 has been moved into the locking position by unintentional manual action. The tongue 33 is out of engagement with the recess 26 of the plunger and located above the lock plunger according to the drawing. However, through a closing movement the tongue slides along the slide surface 27 of the plunger, passes the short projection 25 of the lock plunger and snaps into the recess 26 so that the lock plunger engages entirely with the lock plate 31 as shown in FIG. 4. This displacement of the plunger in the casing 16 is possible through the rocking of the links 19.

In FIGS. 6–8 on the drawing the numeral 34 designates an angular lock plunger, whose locking arm 35 serves as striking arm during the swinging of the plunger, and whose lever 36 is branched. In the angle between the locking arm 35 and the lever 36 the lock plunger 34 is provided with pins 37 projecting on either side and adapted to rotate and slide in slots 38 provided in a casing enclosing the lock mechanism. The branches 36 are interconnected by means of an axle 39 on which one end of a pressure-loaded link 40 is pivoted. In a frame (not shown in the drawing) a means 41 (lock plate) of hard rubber or another non-metallic material is mounted, which means is provided with an arc-shaped recess 42 that receives the outer end of the locking arm 35 when the lock plunger swings into locking position, and out of it. Mounted in a casing is an axle 42a provided with a roller of hard rubber, which serves as a stop for the lever 36 and also partakes in bringing the lock plunger into the operative position. 43 and 44 are end pieces of a casing according to FIG. 8, provided with slots 38. One end of a compression spring 45 is fitted into a rear wall of the casing and its other end is fitted around the link 40.

The lock works as follows:

In FIG. 6 the door is supposed to be open with the lock in the inoperative position. When the door is swung into closed position the recess 42 of the means 41 actuates the locking arm 35 of the plunger 34, so that the plunger and thus also its pins 37 are displaced downwards in the slots 38, the pins 37 of the lock plunger 34 accordingly withdrawing downward from line a—a. At the same time the lever 36 of the plunger 34 is displaced and swung, in the first stage over the axle 42a provided with a roller, so that the axle 39 passes the line a—a. Through this cooperation between the turning points 37 and 39, in which the turning point 37 goes under the line and the turning point 39, which is actuated by the pressure-rod, passes the said pressure-line, the lock plunger 34 changes rapidly from inoperative position to operative position, i.e. the locking arm of the lock plunger 34 acts through the means 41 on the door so that the latter is brought into the closed position. Throughout its swinging movement from inoperative position to locking position the lock plunger is pushed towards the link 40. While passing over the roller 42a and moving away from the line a—a under influence of the force exerted by the link 40 the lever 36 of the lock plunger 34 increases its working arm relatively to the turning pins 37 of the lock plunger 34. Thereby also the force of the link 40 increases, so that the lock plunger gains in closing power while swinging into the locking position. During the whole swinging movement of the lock plunger 34 its locking arm 35 is pressed against the recess 42 of the means 41, finally entering the same in the locking position. In consequence thereof, the lock plunger cannot cause any noise such as bangs or the like while swinging from the inoperative position and back again.

When opening the door, the above function is reversed, the pressure exerted by the lock plunger 34 decreasing as the door is swinging open, until in the fully open position shown in FIG. 6 the lock plunger stops in the so-called inoperative position. The pins 37 and the axle 39 have now passed the line a—a, the pins 37 stopping at the end of the slot 38 in the line a—a and the axle 39 below the pressure line. Through this shifting movement the lock plunger 34 accelerates the opening motion of the door.

In the embodiment shown in FIGS. 9 and 10 the numeral 46 designates a door, shutter or the like, and 47 a door frame. Fastened by screws to the door inside 48 is a lock casing 49 provided with two side walls 50 paralleling each other, and a rear wall 51. The side walls 50 have bent-out portions forming lugs for fastening the lock casing to the door inside. Each fastening lug is provided with oval slots for the screws.

The lock casing 49 accommodates the lock plunger. The latter consists of two levers 52 and 53 forming an obtuse angle with each other. The lever 53 is provided with a semi-circular recess 54, which is intended to co-operate with a lock plate 55 fastened to the door frame 47. The other lever, 52, is pressure-actuated, for instance from a compression spring. The portion of the lock plunger 52, 53 lying in the angle between the levers 52 and 53 is provided with a through slot 56, which extends toward the semi-circular recess 54 and through which an axle 57, fastened in the side walls 50 of the lock casing, is arranged as bearing for the swinging movement of the lock plunger 52, 53.

The portion of the lever 53 located adjacent to the recess 54 is, on the side of the lever facing off the door inside 48, adapted into a slide face 58. The slide face 58 is intended to serve as a "fall" in case the lock plunger is unintentionally brought into locking position when the door is open.

In the embodiment shown in the drawing, the outer end of the lever 52 is pivoted at 59 to a pressure link 60 intended to co-operate with a compression spring, which is mounted between the pressure link 60 and the rear wall 51 of the lock casing.

In the inoperative position of the lock plunger, i.e. the position shown in FIG. 9, the slide face 58 forms a continuation of the external surface 61 of the lock casing which faces off the door inside 48. The side of the lever 53 which is located opposite the slide face 58 is practically parallel with the door inside 48 when the lock plunger is in the locking position.

The functioning of this locking device can be described as follows: Starting from the position (inoperative position) the lock plunger has in FIG. 9 and assuming that the door 46 is moved towards the door frame, i.e. towards the closed position, the lock plate 55 will act upon the recess 54 of the lever 53 in such a way that the levers 52 and 53 are turned about the axle 57, the lock plunger at the same time being moved away from the door frame. This all takes place substantially with the lock plate 55 as a fulcrum of movement. During the progress of operation, the recess 54 moves all nearer to the door inside 48, the distance between the latter and the lock plate of course also diminishing, whereas the pivot 59 of the pressure link 60 moves away from the door inside. In this position shown in FIG. 9 the compressive force exerts a braking effect on the said motion, but after a dead point has been passed, the compressive force promotes the motion, so that the door is closed quickly and efficiently. When the door has been closed the lock plunger with levers 52 and 53 takes up the position shown in FIG. 10.

When the door is opened the levers 52 and 53 are turned in the reverse direction and finally take up the position shown in FIG. 9 when the door is fully open.

Such an instantaneously swingable lock plunger as is used in this locking device may of course easily be brought into the locking position quite unintentionally when the door is open. To allow closing of the door in such a case, without first restoring the lock plunger manually to the inoperative position, the slide surface 58 serves as a so-called "fall," sliding against the lock plate 55 during closing of the door so that the whole lock plunger with levers 52 and 53 is displaced along the door inside 48 parallely to the latter in the direction away from the lock plate 55. Also in these circumstances the locking device reaches the final position shown in FIG. 10 when the door is entirely closed.

The embodiment shown in FIGS. 11–13 presents a lock casing which is open inwardly toward the closet or the like and has two side walls 62 paralleling each other, and a bottom 63. In each side wall is a hole 64, which is irregular, and the edge 65 of which facing off the bottom 63 forms an acute angle with the latter. Extending from the hole 64 is a slot 66, which is slightly curved so that it has a rise which increases from the mouth in the hole 64 to the end of the slot. In the slots 66 the ends 67 of an axle 68 are fitted, on which the lock plunger is pivoted. The lock plunger consists mainly of two levers 69 and 72, one of which, 69, is provided with a semi-circular recess 70 intended to co-operate with a lock plate 71 mounted for instance to a door frame. The other lever 72, is provided with a recess 73 in the end facing off the axle 68. The levers 69 and 72 are forming an obtuse angle with each other, and the axle 68 goes through a hole in the lock plunger, located in the angle between the levers 69 and 72. The lock plunger is urged towards the bottom of the slots by pressure. This pressure is, in the embodiment shown, effected by a compression spring 74 which is, in FIGS. 11 and 12, guided by a guide link 75, which engages via a pin 76 with the recess 73 in the end of the lever 72. The other end of the guide link 75 is provided with a longitudinal slot 77 embracing a pivot 78, which is inserted from above in FIGS. 11 and 12 into an oblique groove 79 in the side walls 62.

The embodiments shown work as follows: FIG. 11 shows the lock plunger in the inoperative position and FIG. 12 in the locking position. In FIG. 11, the door is open. When closing the door, the lock plunger 69, 72 is turned about the axle 68, and the latter is simultaneously displaced in the slots 66 while compressing the compression spring 74. When the lock plunger 69, 72 has been turned so much that the pin 76 passes a line through the pivot 78 and the axle 68, the lock plunger snaps into the locking position during the last stage of the door closing, the end of the lever 72 provided with the recess 70 shifting over so that the pivot 76 stops against the component guide surfaces 65.

With the door closed, the lock plunger 69, 72 is in the position shown in FIG. 12. When opening the door, the same procedure takes place in reverse order. If the lock plunger 69, 72 moves unintentionally from the inoperative position to locking position when the door is open, it need not be restored manually, as the oblique front end 80 of the lever 69 serves as a "fall" during closing of the door, gliding on the lock plate 71, so that the lock plunger 69, 72 is displaced substantially parallely with itself to the left in the drawing, i.e. against the pressure of the spring 74. During this displacement the lock plunger 69, 72 is guided by the slots 66 and the component guide surfaces 65.

This locking device is not only very efficient in use but also easy to manufacture. Thanks to the design described, no riveting is needed, the assembling being done as follows: The lock plunger 69, 72 is placed between the walls 62 so that the axle hole registers with the holes 64, the axle 68 is put through the said hole in the lock plunger and the latter is withdrawn so that the axle ends 67 enter the slots 66, whereafter the link 75 and the compression spring 74 are easily mounted by means of simple tools.

In FIG. 14 a further embodiment of the invention is shown. Here, the lock casing consists of two side walls 81, a roof 82 and a rear wall. Slots 83 resembling the slots 66 in FIGS. 11 and 12 are provided in the walls 81. The slot bottoms are remote from the rear wall and the slot ends facing the rear wall are enlargened so as to form a larger circular hole 84. The edge 65 of the hole 64 in FIGS. 11 and 12 is in FIG. 14 replaced by the roof 82 of the lock casing. The guide link 75 is replaced by a shorter link 85, which is pivoted on a pin 86 in the recess 73 of the lever 72. The link 85 has a guide for one end of a compression spring 87, and the other end of the compression spring is guided by a bent-in lap on the rear wall of the lock casing.

Of course the invention is not confined to the embodiments described above and illustrated in the accompanying drawings, but may be varied in several ways within the scope of the following claims. By way of example the axle 68 need not have reduced ends as shown in FIG. 13, but may also have enlargened ends located outside the walls 72, and 81 respectively. Furthermore, the axle may have circular grooves receiving the wall portions confining the slots. Also, the compression spring 74, and 87 respectively, may act on the side of the lever 72 facing off the axle 68 in some other way than is shown in the drawing.

The end of lever 72 may, as appears from FIG. 14, be provided with one or several rollers 88, which are rolling along the inside of the lock casing roof 82 during parallel displacement of the lock plunger and come to rest against the lock casing roof 82 when the lock plunger swings from inoperative position to locking position. With rollers of plastic the sound caused by this swinging is fairly well damped.

I claim:
1. A locking device for doors, shutters and the like, comprising: a lock plunger; said lock plunger consisting of a lever having two rigidly connected arms, said arms forming an obtuse angle with each other, one of said arms being a locking arm having a free end, and the other being an operating arm having a free end; said lock plunger being provided at the vertex of said obtuse angle with two pins which protrude from the sides of the lock plunger; a casing enclosing said locking device; and having side walls; said two pins being slidable in slots provided in said side walls; the free end of said operating arm being hinged by a joint to one end of a pressure-loaded link; a lock means, such as a lock plate fastened to a door frame, or the like; said lock plunger being adapted to swing, during closing of the door or the like, around the free end of said locking arm, said lock means serving as bearing for said swing; said pins, at the same time, sliding in said slots in a direction away from said lock means, while the lock plunger turns simultaneously around said pins, said operating arm being simultaneously and gradually removed from its initial position, said removal of said operating arm being first counter-acted by said pressure-loaded link and being finally completed by the action of the latter.

2. A locking device as claimed in claim 1, characterized further in that said hinged joint between said operating arm and said pressure-loaded link is located, at the beginning of the closing movement, on one side of a plane passing through the center of said pins and said hinged joint; said side facing the door, and in that said hinged joint is forced above said plane during the first part of the closing movement.

3. A locking device as claimed in claim 2, further characterized in that, at the beginning of the closing movement, said hinged joint is fitted in a supporting axle located between said plane and the door's inside, and adapted to cooperate with the free end of said operating arm to facilitate the turning of said lock plunger; said supporting axle being provided with a rotary roller, the free end of said operating lever being rounded so as to pass easily over said roller.

4. A locking device as claimed in claim 3, characterized further in that said slots are so shaped that the locking arm is parallel to its tangents during the whole closing movement.

References Cited by the Examiner
UNITED STATES PATENTS 2,252,591  8/41  Anderson _____ 292—63
2,833,578  5/58  Burke _____ 292—78 X

FOREIGN PATENTS 947,141  8/56  Germany.

M. HENSON WOOD, Jr., Primary Examiner.
ALBERT H. KAMPE, Examiner.